United States Patent [19]

Boetto

[11] 4,398,608

[45] Aug. 16, 1983

[54] ROTARY HOE

[75] Inventor: Charles Boetto, Naperville, Ill.

[73] Assignee: International Harvester Co., Chicago, Ill.

[21] Appl. No.: 264,363

[22] Filed: May 18, 1981

[51] Int. Cl.³ .............................................. A01B 39/08
[52] U.S. Cl. .................................... 172/551; 172/573; 384/291
[58] Field of Search ...................... 308/15, 19, 21, 1 A, 308/36, 37; 267/54 R; 188/218; 172/572, 705, 573, 710, 551, 711, 748; 305/11, 13; 403/14, 58, 59; 301/1, 5 R, 105; 384/291

[56] References Cited

U.S. PATENT DOCUMENTS

| 1,603,543 | 10/1926 | Jett | 305/14 |
| 1,957,077 | 5/1934 | Ratigan | 308/21 |
| 2,087,882 | 7/1937 | Brown | 301/1 |
| 3,734,201 | 5/1973 | Zaun | 172/573 |
| 4,194,575 | 3/1980 | Whalen | 172/551 |

Primary Examiner—Richard J. Johnson
Attorney, Agent, or Firm—Dennis K. Sullivan; F. David AuBuchon

[57] ABSTRACT

A hoe that includes a transversely extending tool bar, a pivot shaft mounted on the rear and lower portion of the tool bar and extending parallel thereto, a plurality of support arms spaced along the tool bar and pivotally mounted on the shaft, each arm having a forward portion for engaging the tool bar and a rearward portion for rotatably supporting a hoe wheel, a spring extending between each arm and the tool bar to bias the hoe wheel downwardly with each arm forward portion providing a stop with the tool bar to dispose the hoe wheels in the same operative position, and each arm having a hub pivotally mounted on the pivot shaft and including preferably a plurality of elongated grooves extending parallel and adjacent the shaft the full length of the hub and a lower drain in communication with the grooves to remove soil moving between hub and shaft to free the arm and thus hoe wheel for movement by the spring.

4 Claims, 8 Drawing Figures

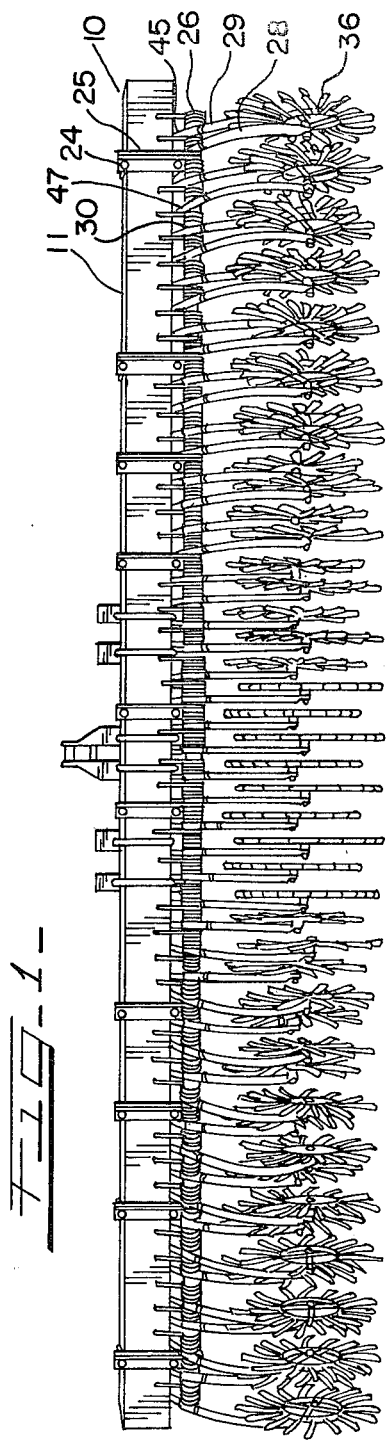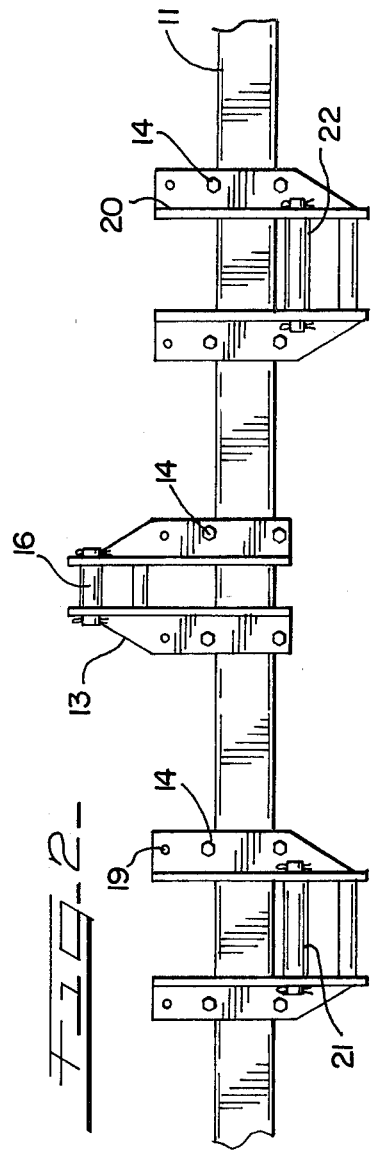

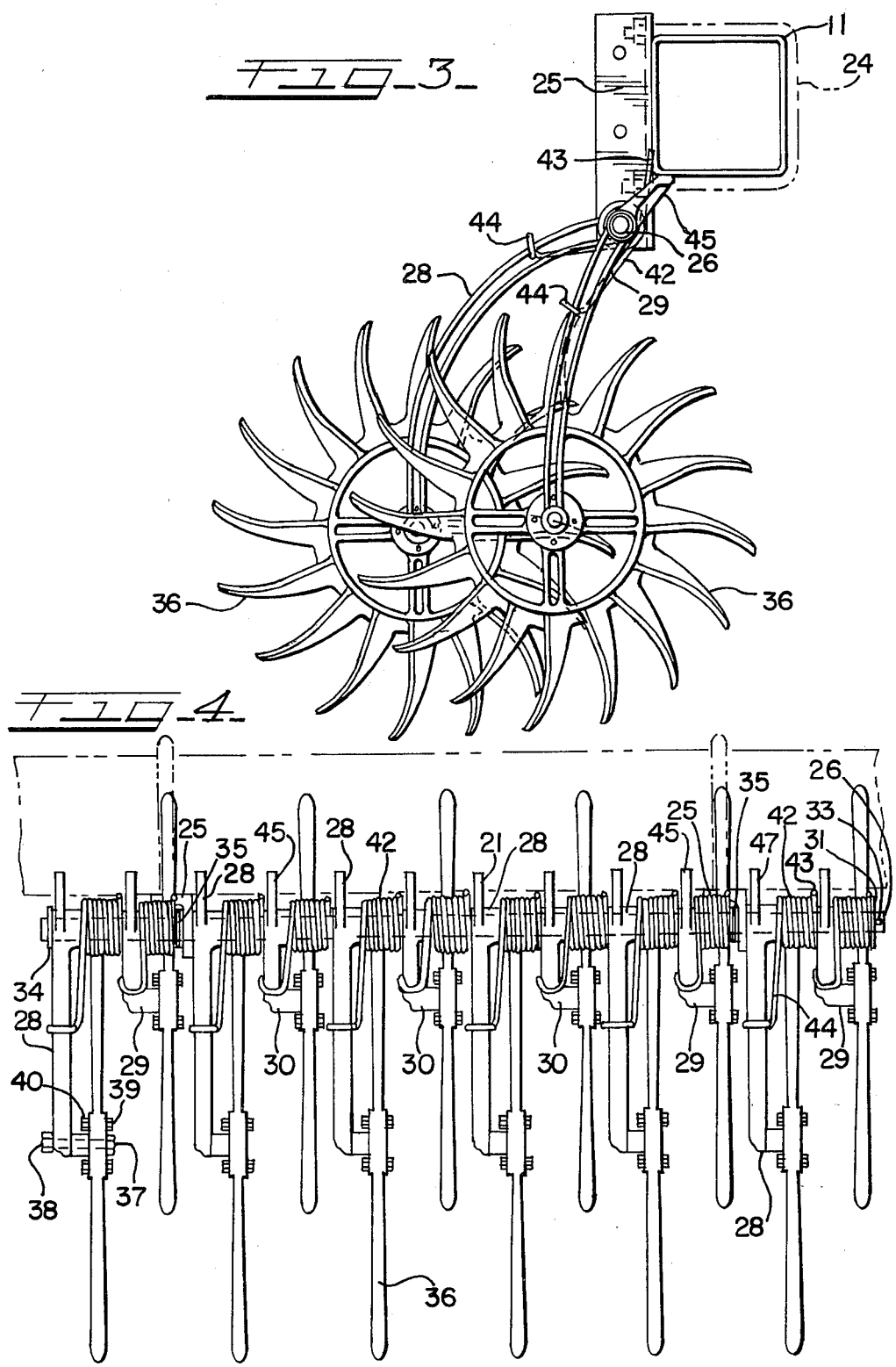

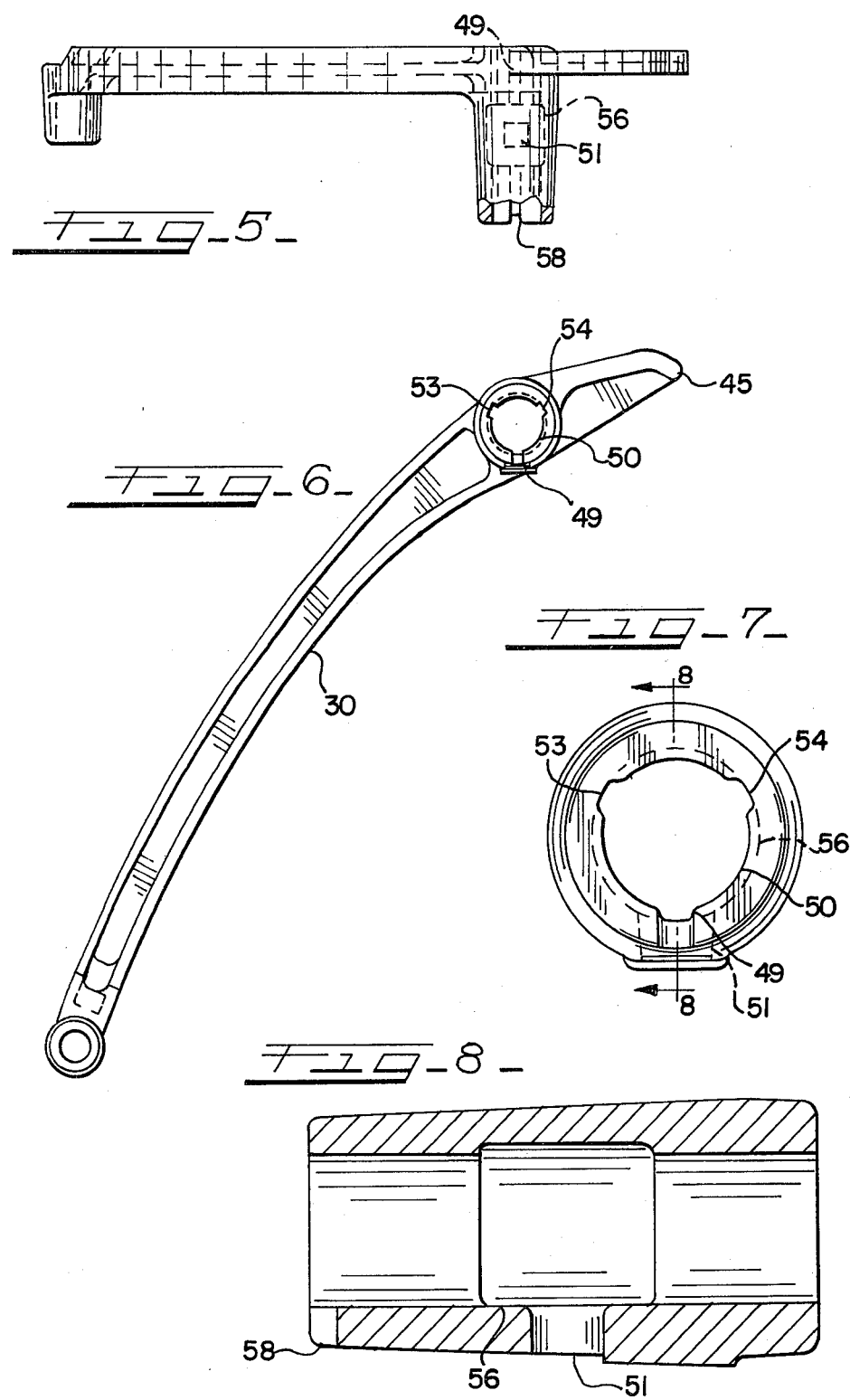

ROTARY HOE

BACKGROUND OF THE INVENTION

1. Field of the Invention

This invention pertains generally to tool bar equipped rotary hoes and more particularly to hoes wherein each hoe wheel of a plurality of hoe wheels is individually biased downwardly toward the soil.

2. Description of the Prior Art

Conventional rotary hoes today, utilize a tool bar which is usually connected to the tractor by a three point hitch. The tool bar supports a rearward, parallel extending pivot shaft which supports a plurality of abutting pivotally mounted hoe wheel arms. Each arm has a hoe wheel rotatably mounted on its lower portion and an upper stop that abuts the tool bar when raised via a helical torsion spring that extends between the arm and the tool bar. Most commonly long and short arms are interspersed along the pivot shaft with varying stop structure to provide two longitudinally spaced rows of wheels which resist the tendency of the hoe wheels to carry trash along as they are drawn across the soil. The stops also properly position all of the hoe wheels and when the tool bar is lowered, the springs are equally deflected depending upon the amount of weight transferred thereto by the tractor hitch. Because of a spring per arm and the single wheel per arm, each wheel can follow the terrain regardless of obstacles without affecting the other. The above described rotary hoe is of light weight, easily handled by a tractor, and provides high speed cultivation of even narrow rows.

Due to the hoe wheel action and their close in location to the tool bar however, considerable soil is thrown into the air and falls on the area of the pivot shaft although a shield usually protects the operator. While the hub bearing of each arm is generally located adjacent the hub of another on the shaft to keep the hoe wheels operating in a substantially vertical plane, nevertheless the soil gets between the pivot shaft and each hub and the associated arm frequently freezes on the shaft in an upraised position with the spring unable to return same to the stop position when the tool bar is raised. Hence when the tool bar is again lowered, all of the hoe wheels are not similarly positioned and the raised hoe wheel may not contact the soil or may be above the depth of the others. Thus, the terrain covered by the rotary hoe is not uniformly hoed. Also, the hoe wheel may freeze in a high raised position after encountering an obstacle. Hereto, effective hoeing is not possible. The operator has to then stop the hoeing process to free the arm on the shaft and perhaps disassemble same so that the spring can again control the arm and hoe wheel. This increases the down time of the hoe.

SUMMARY OF THE INVENTION

Applicant as a consequence, improved on the arm mounting design of the prior art to eliminate the freezing of the arm on the pivot shaft against the effort of the spring.

Specifically, Applicant provides at least one, but preferably three equally radially spaced elongated grooves in the arm hub while maintaining an efficient bearing surface. The grooves are located adjacent and extend parallel to the pivot shaft. The grooves, unlike those used in lubricated bearings, extend the length of the hub where same contacts the shaft. Soil moving inward between the shaft and hub is moved into the grooves as the hub and arm pivot on the shaft and into an accumulator within the length of the hub that connects all of the grooves and out a lower drain connected to the accumulator. The helical torsion spring loosely surrounds the hub and does not affect the movement of soil out of the drain. To further increase the movement of soil out from between the hub and pivot shaft, a vertical drain groove is connected to the lowest elongated groove to drain same at the hub end remote from the hub arm which contacts the hub of the adjacent arm. This cleaning of the soil from between the arm hub and pivot shaft while still providing an effective bearing surface, allows the spring to control the individual arm and thus hoe wheel for non-stop, efficient hoeing.

It is, therefore, an object of this invention to provide a new and improved rotary hoe.

Another object is to reduce the down time of the rotary hoe.

Another object of this invention is to provide a rotary hoe resilient arm mounting design that does not freeze on the pivot shaft.

BRIEF DESCRIPTION OF THE DRAWINGS

FIG. 1 is a rear view of the rotary hoe of this invention;

FIG. 2 is a partial front view of the rotary hoe showing the structure for connection to a tractor three-point hitch;

FIG. 3 is a right side view showing a portion of the rotary hoe;

FIG. 4 is a plan view of a portion of the rotary hoe shown in FIG. 3 with the tool bar shown in broken lines;

FIG. 5 is a plan view of a front rotary hoe arm;

FIG. 6 is a side view of the arm of FIG. 5;

FIG. 7 is an enlarged side view of the hub similar to that shown in FIG. 6; and

FIG. 8 is a sectional view taken on line 8—8 of FIG. 7.

DESCRIPTION OF THE PREFERRED EMBODIMENT

Referring to FIGS. 1 and 2, 10 indicates a rotary hoe that includes a transversely extending tool bar 11 which is normally attached to a tractor (not shown) for towing. As shown best in FIG. 2, hoe 10 includes upstanding mast member 13 secured to the forward and central part of the tool bar 11 by U-bolts 14 that also has a hitch pin 16 at its upper end for connection to the compression link of a tractor 3-point hitch. Spaced brackets 19 and 20 on each side of mast 13 and also attached to the forward side of the tool bar by U-bolts 14 have lower hitch pins 21 and 22 that provide a connection with the lower draft links of the tractor three-point hitch.

As best shown in FIGS 1, 3 and 4, tool bar 11 has mounted on the rear thereof by U-bolts 24 spaced bearing angle brackets 25 that support pivot shaft 26 which extends parallel to tool bar 11 and below same. Pivotally mounted on shaft 26 via upper hub portions and interspaced along shaft 26 are long hoe support arms 28 and short hoe arms with short hubs 29 or short hoe support arms with long hubs 30. Short hoe arm 29 is located at the right end of the hoe and has washers 31 adjacent the hub taking up the space to the cotter pin 33 located at the shaft 26 which secures this end of the shaft on the hoe. Short hoe arm 29 is also located adjacent bearing bracket 25 with washers 35 in between.

Long hoe arm 23 is located on shaft 26 with one end of its hub adjacent short hoe arm hub 29 at the right side of the hoe and the other end aginst bearing bracket 25. The next—moving from right to left—long hoe arm 28 is located on shaft 26 with its hub adjacent short hoe arm 29. Short hoe arm 30 with a long hub is then located adjacent long hoe arm hub 28 as again moving from the right. This sequence (28-30) continues until the next bearing 25 is encountered and arm 29 is utilized. Via a washer 34 fixed to shaft 26, all of the arms are maintained in abutting arrangement with the noted washers and bearings, so that the arms pivot on the shaft in a vertical plane.

A hoe wheel 36 is rotatably mounted to the end of each hoe arm. Preferably an anti-friction bearing is utilized with the inner race held rigid to the lower hub of each arm by bolt 37 and nut 38 and the outer race fastened by a plate and bolts 39 and nut 40 to the wheel. The hoe wheel of each arm is preferably mounted adjacent a side of the lower hub but within the length of the upper hub for a generally centered bearing load on the upper hub. Coiled around the upper hubs of all of the arms is a helical torsion spring 42 which has one end 43 abutting the tool bar and the other 44 hooked around a portion of an arm between the upper and lower hubs. To maintain the hoe wheels of the long arms 28 and the short arms 29 and 30 when the tool bar is raised in the proper position arms 29 and 30 have an upper portion 45 which provides a stop against the action of springs 42. This places all of the hoe wheels 36 attached to the short arms in the first forward row. The long hoe arms 28 have an upper portion 47 that has a different angle than 45 that provides a stop against the action of spring 42. This places all of the hoe wheels on the long arms in the second row of the hoe. Thus, both rows of hoe wheels are longitudinally spaced but located at the same elevation when the tool bar is raised.

When the tool bar is lowered, the springs deflect equally and the hoe wheels go to the depth determined by the weight of the implement supported thereon due to the tractor three-point hitch. As hoeing progresses, if a single hoe wheel strikes an obstacle it raises without affecting the balance of the hoe wheels and when the obstacle is passed it returns to its original position due to the spring action. Thus, all hoe wheels follow the ground contour. As mentioned, the hoe action tends to throw soil on the pivot shaft area and same tends to move between the abutting hubs and shaft to freeze the hubs and thus arms and attached hoes in an up position that the springs cannot overcome. This interrupts hoeing.

As shown best in FIGS. 5, 6, 7 and 8, which relate to arm 30, but the principle is the same for all of the arms, Applicant provides specific structure to overcome this problem. Specifically, Applicant provides lower groove 49 that is recessed outwardly from the bore 50 for pivot shaft 26. Groove 49 extends the length of the upper hub of arm 30. Drain means 51 in the lower part of the hub and within the length of the hub is in communication with groove 49. Soil moving between the shaft 26 and bore 50 is moved into groove 49, as the hub pivots on the shaft, and exits out the drain means 51 unaffected by the loosely fitting torsion spring wound about the hub. Preferably, two other grooves 53 and 54 are also utilized with three grooves being equally radially spaced around the bore. An accumulator 56 is also preferably utilized that generally surrounds the bore 50 to the depth of the grooves and is located within the length of the hub. The drain means or square hole 51 is connected to the accumulator 56 at the lower part of the hub. This structure provides a good bearing surface for the hub on shaft 26 and improved movement of the soil out the drain means. Also, provided for improved drainage is a vertical groove 58 connected to lower groove 49 that provides drainage at the end of the hub which would normally abut the hub and the arm of the next adjacent arm.

The above structure removes the entrapped soil and prevents freezing of the arm on shaft 26 allowing spring 42 to provide its function of allowing the hoe wheel to follow the terrain without affecting the other hoe wheels of the hoe.

What is claimed is:

1. In a rotary hoe that includes an elongated tool bar extending generally transversely to the normal direction of travel of the rotary hoe, an elongated pivot shaft supported on the lower, rear corner of the tool bar and extending parallel thereto, a plurality of support arms spaced along the tool bar and pivotally mounted on said pivot shaft, each support arm having a forward portion for engaging said tool bar and a rearward portion, a hoe wheel rotatably mounted on each arm rearward portion, and spring means extending between each arm and said tool bar to bias the hoe wheel downwardly with each arm forward portion providing a stop with said tool bar to dispose said hoe wheels in an operative position, wherein the improvement comprises: each arm having a hub pivotally mounted on said pivot shaft, said hub having at least one elongated groove extending parallel to and adjacent said shaft, said groove extending the length of said hub on said shaft, and lower drain means establishing soil removing communication from said groove exteriorly of said hub.

2. The rotary hoe of claim 1 in which said hub has a plurality of radially spaced grooves and a generally circumferentially extending accumulator means located within said hub length and recessed from said shaft and connecting said grooves, said drain means being connected to said accumulator means.

3. The rotary hoe of claim 2 in which said plurality of grooves consists of three equally spaced grooves with one groove being located in the lower part of the hub.

4. The rotary hoe of claim 3 in which said hub is connected to said arm at one end of its length and further including a downwardly extending groove at the other end of its length connected to the one groove to remove soil therefrom.

* * * * *